United States Patent

[11] 3,621,058

[72] Inventors Masuo Murakami
Tokyo;
Masaru Iwanami, Kanagawa-ken; Kazuo Kubo, Saitama-ken; Kenji Sano, Saitama-ken; Mashiro Kochiya, Tokyo; Hideki Arima, Tokyo, all of Japan
[21] Appl. No. 836,648
[22] Filed June 25, 1969
[45] Patented Nov. 16, 1971
[73] Assignee Yamanouchi Pharmaceutical Co., Ltd. Tokyo, Japan
[32] Priority June 27, 1968
[33] Japan
[31] 43/44158

[54] NOVEL FORMAMIDO-CYCLOALKANE DERIVATIVES
15 Claims, No Drawings
[52] U.S. Cl. ...................................... 260/561 R, 424/320
[51] Int. Cl. .................................... C07c 103/00
[50] Field of Search.......................... 260/561 R

[56] References Cited
UNITED STATES PATENTS

| | | | |
|---|---|---|---|
| 3,256,311 | 6/1966 | Becke et al. ................. | 260/464 |
| 3,509,212 | 4/1970 | Fonken et al. ................ | 260/561 |

Primary Examiner—Lewis Gotts
Assistant Examiner—Ethel G. Love
Attorney—Wenderoth, Lind and Ponack ABSTRACT: Novel formamido-cycloalkane derivatives of the formula

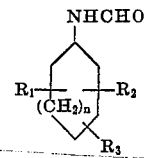

wherein $R_1$ and $R_2$ are same or different and each represents a hydrogen atom or an alkyl radical having one to five carbon atoms, $R_3$ represents an alkyl radical having one to 10 carbon atoms and $n$ is an integer from one to two. The compounds are excellent as analgesic.

NOVEL FORMAMIDO-CYCLOALKANE DERIVATIVES

This invention relates to novel compounds which are excellent as analgesic. More particularly, it relates to novel formamido-cycloalkane derivatives of the formula

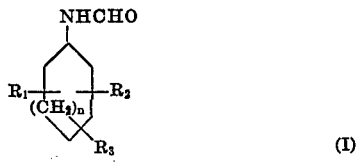

(I)

wherein $R_1$ and $R_2$ are same or different and each represents a hydrogen atom or a straight or branched chain alkyl radical having from one to five carbon atoms, such as methyl, ethyl, propyl, isopropyl, butyl, isobutyl, amyl, etc., $R_3$ represents a straight or branched chain alkyl radical having from one to 10 carbon atoms, such as methyl, ethyl, propyl, isopropyl, butyl, isobutyl, t-butyl, amyl, hexyl, heptyl, octyl, nonyl, etc., said $R_2$ and $R_3$ being optionally bound to the same carbon atom in the cycloalkane ring, and $n$ is an integer from 1 to 2.

Recently a large number of compounds have been used as analgesic, However, there is a problem not yet solved in this field that many compounds having a strong analgetic effect, such as narcotic analgesics, often show on the other hand a strong toxicity or the habituation.

Now, it has been found that the formamido-cycloalkane derivatives of the formula (I) of this invention have a strong analgetic activity and nevertheless are low toxic.

As examples of the compounds of this invention, the following can be mentioned: trans-1-formamido-4-methylcyclohexane, cis-1-formamido-4-methylcyclohexane, 1-formamido-3-methylcycloheptane, 1-formamido-4-methylcycloheptane, 4-ethyl-1-formamidocycloheptane, 1-formamido-4-(1-methylpropyl) cyclohexane, 1-formamido-4-(1-methylbutyl)cyclohexane, 1-formamido-4-nonylcyclohexane, 1-formamido-4,4-dimethylcyclohexane, 1-formamido-4,5-dimethylcycloheptane, 1-formamido-2,4,6-trimethylcyclohexane, etc.

The compounds of this invention are prepared by introducing formyl group to the amino group of a cycloalkylamine derivative of the formula

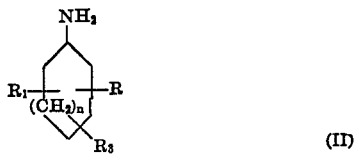

(II)

wherein $R_1$, $R_2$, $R_3$ and $n$ have the meanings set forth above.

The introduction of formyl group can be carried out by a known method, for example, be reacting a starting material of the formula (II) with a mixture of formic acid and acetic anhydride at room temperature or under mild heating, by reacting the starting material with formic acid, formic ester or formamide under heating, or by reacting the starting material with chloral first at room temperature and then under heating.

Although the formylating agent is well used in an approximately equimolar amount to the starting compound of the formula (II), some formylating agents which may serve also as solvent, such as formic acid, may be used in excess.

The final product formed can be separated and recovered from the reaction mixture by conventional chemical procedures such as concentration, distillation, column chromatography, recrystallization, etc.

Procedures for the preparation of the compounds of this invention will be illustrated by examples, later on.

The cycloalkylamine derivatives of the formula (II) which are used as the starting material for manufacturing the formamido-cycloalkanes of this invention are also novel, except the two compounds, trans-4-methylcyclohexylamine and cis-4-methylcyclohexylamine. They can be prepared from the corresponding alkanone-oxime derivatives by a conventional reduction method such as the reduction with metallic sodium, Raney nickel, etc.

Procedures for the preparation of the starting materials of this invention will be illustrated later on by method examples.

To demonstrate the improvement brought about by the compounds of this invention, comparative tests on the analgetic activity were effected between the compounds of this invention and known analgetic compounds, sulpyrine and formamido-cyclohexane.

EXPERIMENTAL PROCEDURE

The test was carried out according to the method described by R. Koster et al. (Fed. Proc. 18, 412 (1959)).

The saline solution containing a compound to be tested in a prescribed concentration was injected subcutaneously into a group of eight male mice (D D strain, weighing between 14 and 20 g.) in an amount of 10 ml. per 1 kg. body weight. Into the group for control of eight mice, 10 ml. of the simple saline solution were injected in an analogous manner. At 45 to 90 minutes after the administration, 0.6 percent aqueous acetic acid solution was injected intraperitoneally into each mouse of the test group and the control group in an amount of 10 ml. per 1 kg. body weight. Then, the number of struggles (exercises in bending and stretching of legs) was counted during the time period of 20 minutes after each intraperitoneal injection. The reduction rate (percent) of struggles was computed by the following equation:

$$\frac{\text{Difference in the number of struggles between the test group and the control group (mean value of eight mice for each group)}}{\text{The number of struggles in the control group (mean value of eight mice)}} \times 100$$

The results obtained are shown in Table I.

TABLE I

| Compound tested | Dose (mg./kg.) | Reduction rate of struggles after— | | Remarks |
| --- | --- | --- | --- | --- |
| | | 45 min. | 90 min. | |
| Trans-1-formamido-4-methylcyclohexane. | 5.8 | 74.0 | 72.8 | Compound of Ex. 1. |
| Cis-1-formamido-4-methylcyclohexane. | 5.8 | 30.0 | 65.8 | Compound of Ex. 2. |
| 1-formamido-3-methylcycloheptane. | 6.3 | 42.5 | 70.0 | Compound of Ex. 3. |
| 1-formamido-4-methylcycloheptane. | 6.3 | 75.5 | 59.5 | Compound of Ex. 4. |
| 1-formamido-2,4,6-trimethylcyclohexane. | 6.9 | 79.5 | 60.0 | Compound of Ex. 10. |
| Sulpyrine | 28.3 | 19.2 | 5.8 | Known analgesic. |
| Formamido-cyclohexane. | 10.3 | 15.0 | 18.0 | Known compound. |

As is apparent from table I, the analgetic effect of the compounds of this invention is excellent.

The toxicity of the compounds of this invention was tested with groups of eight mice each (male mice of D D strain, weighing from 14 to 20 g.) by subcutaneous injection. The results obtained are shown in table II.

TABLE II

| Compound tested | M.L.D. (mg./kg.) | L.D.$_{50}$ (mg./kg.) | Remarks |
| --- | --- | --- | --- |
| Trans-4-methylcyclohexylamine hydrochloride. | 154 | 220 | Starting compound in Ex. 1. |
| Trans-1-formamido-4-methylcyclohexane. | 260 | 372 | Compound of Ex. 1. |

The compounds of this invention may be administered orally, as a preparation in the form, for example, of tablets, powder, capsules, etc., or parenterally (intramuscularly or subcutaneously), as a preparation in the form of injections. For the oral administration, enteric coating preparations are preferred.

The clinical dose of compounds of this invention for adult is usually in the range from 0.09 to 1.6 g. per day orally, and from 0.03 to 0.8 g. per day parenterally. The daily dose is administered at proper intervals, being divided into two or three portions. The dose may vary depending on the age and physical condition of the patient.

The methods for the preparation of the starting materials are as follows:

METHOD EXAMPLE 1

In 200 ml. of ethanol were dissolved 16.5 g. of 4-(1-methylpropyl)cyclohexanone oxime, and to the resulting solution were added gradually 26 g. of metallic sodium under refluxing. After the addition, the reaction mixture was acidified with 10 percent aqueous solution of hydrochloric acid, and then the ethanol was distilled off under reduced pressure. The residue was extracted twice with 20 ml. each of ether, and then the aqueous layer was strongly alkalified with 20 percent aqueous solution and sodium hydroxide and extracted three times with 20 ml. each of ether. The ether extracts were combined and dried over potassium carbonate. After distilling off the ether under reduced pressure, the residue was distilled in vacuo to give 8 g. of 4-(1-methylpropyl)cyclohexylamine having a boiling point of 103° to 105° C. (at 18 mm. Hg).

The product may be converted into its hydrochloric acid salt having a melting point of 272° to 275° C. by treatment with methanolic hydrochloric acid.

Elementary analysis as $C_{10}H_{22}NCl$

|  | C(%) | H(%) | N(%) |
|---|---|---|---|
| Calculated: | 58.70 | 11.08 | 8.56 |
| Found: | 58.34 | 10.94 | 8.59 |

METHOD EXAMPLE 2

In 200 ml. of ethanol were dissolved 6.8 g. of 4-ethylcycloheptanone oxime, and to the resulting solution were gradually added 16 g. of metallic sodium under refluxing. Then the reaction mixture was acidified with 10 percent aqueous solution of hydrochloric acid. The ethanol was distilled off under reduced pressure, and the residue was extracted twice with 20 ml. each of ether. The aqueous layer was alkalified strongly with 20 percent aqueous solution of sodium hydroxide, and then extracted three times with ether. The extracts were combined together and dried with potassium carbonate. After distilling off the ether under reduced pressure, the residue was distilled to give 4.3 g. of 4-ethylcycloheptylamine having a boiling point of 200° to 202° C. (at 18 mm. Hg).

The product may be converted into its phosphoric acid salt having a melting point of 138° to 141° C. by treatment with methanolic phosphoric acid.

Elementary analysis as $C_9H_{22}NPO_4$

|  | C(%) | H(%) | N(%) |
|---|---|---|---|
| Calculated: | 45.18 | 9.27 | 5.85 |
| Found: | 45.21 | 9.37 | 5.89 |

METHOD EXAMPLE 3

The procedure of the above method example 2 was followed using 6.2 g. of 3-methylcycloheptanone oxime, 150 ml. of ethanol and 12 g. of metallic sodium, whereby 3.4 g. of 3-methylcycloheptylamine having a boiling point of 180° C. (at 18 mm. Hg) was obtained. The product may further be converted into its phosphoric acid salt having a melting point of 160° C.

Elementary analysis as $C_8H_{20}NPO_4$

|  | C(%) | H(%) | N(%) |
|---|---|---|---|
| Calculated: | 42.66 | 8.95 | 6.22 |
| Found: | 42.92 | 9.08 | 6.32 |

METHOD EXAMPLE 4

The procedure of the above method example 2 was followed using 2 g. of 4,4-dimethylcyclohexanone oxime, 40 ml. of ethanol and 5 g. of metallic sodium, whereby 0.6 g. of 4,4-dimethylcyclohexylamine having a boiling point of 66° to 69° C. (at 20 mm. Hg) was obtained.

The product may further be converted into its hydrochloric acid salt having a melting point higher than 280° C.

Elementary analysis as $C_8H_{18}NCl$

|  | C(%) | H(%) | N(%) |
|---|---|---|---|
| Calculated: | 62.64 | 11.56 | 7.30 |
| Found: | 62.51 | 11.63 | 7.26 |

The following examples will serve to illustrate the present invention without limiting it thereto.

EXAMPLE 1

In a mixture of 10.8 g. of 85 percent formic acid and 20.4 g. of acetic anhydride were dissolved 5 g. of trans-4-methylcyclohexylamine hydrochloride, and to the resulting solution 2.3 g. of sodium formate were added. The mixture was stirred for 1 hour at 40° to 50° C., whereby sodium chloride precipitated. The sodium chloride was separated by filtration, and then the filtrate was concentrated under reduced pressure and further distilled under vacuum to give 3.6 g. of trans-1-formamido-4-methylcyclohexane having a boiling point of 155° to 156° C. (at 20 mm. Hg). Yield 76.3 percent. By cooling, the product became crystals having a melting point of 53° to 55° C.

Elementary analysis as $C_8H_{15}NO$

|  | C(%) | H(%) | N(%) |
|---|---|---|---|
| Calculated: | 68.04 | 10.71 | 9.92 |
| Found: | 68.17 | 10.78 | 9.88 |

EXAMPLE 2

In a mixture of 2.2 g. of 85 percent formic acid and 4.1 g. of acetic anhydride was dissolved 1.0 g. of cis-4-methylcyclohexylamine hydrochloride, and to the resulting solution 0.5 g. of sodium formate was added. The mixture thus formed was stirred for 1 hour at 40° to 50° C., whereby sodium chloride precipitated. The precipitates were separated by filtration, and the filtrate was concentrated under reduced pressure and further distilled under vacuum to give 0.75 g. of cis-1-formamido-4-methylcyclohexane having a boiling point of 152° C. (at 21 mm. Hg). Yield: 79.5 percent.

Elementary analysis as $C_8H_{15}NO$

|  | C(%) | H(%) | N(%) |
|---|---|---|---|
| Calculated: | 68.04 | 10.71 | 9.92 |
| Found: | 68.22 | 10.62 | 9.98 |

EXAMPLE 3

In a mixture of 2 g. of 98 percent formic acid and 4.0 g. of acetic anhydride were dissolved 1.8 g. of 3-methylcycloheptylamine phosphate, and to the resulting solution 1.1 g. of sodium formate were added. The mixture thus formed was allowed to stand for 1 hour at 45° to 50° C. The reaction mixture was then concentrated under reduced pressure, and further distilled under vacuum to give 1.05 g. of 1-formamido-3-methylcycloheptane having a boiling point of 174° C. (at 25 mm. Hg). Yield: 84.5 percent.

Elementary analysis as $C_9H_{17}NO$

|  | C(%) | H(%) | N(%) |
|---|---|---|---|
| Calculated: | 69.63 | 11.04 | 9.02 |
| Found: | 69.58 | 11.14 | 9.37 |

EXAMPLE 4

In a mixture of 2.0 g. of 98 percent formic acid and 4.0 g. of acetic anhydride were dissolved 1.2 g. of 4-methylcycloheptylamine phosphate, and to the resulting solution 0.75 g. of sodium formate was added. The mixture thus formed was stirred for 1 hour at 45° to 50° C. The reaction mixture was concentrated under reduced pressure, and further distilled under vacuum to give 0.6 g. of 1-formamido-4-methylcycloheptane having a boiling point of 174° C. (at 22 mm. Hg). Yield: 80 percent.

Elementary analysis $C_9H_{17}NO$

|  | C(%) | H(%) | N(%) |
|---|---|---|---|
| Calculated: | 69.63 | 11.04 | 9.02 |
| Found: | 69.65 | 11.14 | 9.30 |

EXAMPLE 5

In a mixture of 2.0 g. of 98 g. formic acid and 4.0 g. of acetic anhydride were dissolved 2.0 g. of 4-ethylcycloheptylamine phosphate, and to the resulting solution 1.0 g. of sodium formate was added. The mixture thus formed was stirred for 1 hour at 45° to 50° C. The reaction mixture was concentrated under reduced pressure, and further distilled under vacuum to give 1.1 g. of 4-ethyl-1-formamido-cycloheptane having a boiling point of 164° C. (at 7 mm. Hg). Yield: 82 percent.

Elementary analysis as $C_{10}H_{19}NO$

|  | C(%) | H(%) | N(%) |
|---|---|---|---|
| Calculated: | 70.96 | 11.31 | 8.27 |
| Found: | 70.88 | 11.30 | 8.32 |

EXAMPLE 6

A mixture of 1.1 g. of trans-4-methylcyclohexylamine and 6.0 g. of 85 formic acid was refluxed for 30 minutes. The reaction mixture was concentrated under reduced pressure, and then distilled under vacuum to give 1.1 g. of trans-1-formamido-4-methylcyclohexane having a boiling point of 155° C. (at 20 mm. Hg). Yield: 80 percent.

EXAMPLE 7

1.4 g. of 4-ehtylcycloheptylamine and 2.2 g. of ethyl formate were heated for 4 hours at 100° to 120° C. in a sealed tube. After cooling, the reaction mixture was concentrated under reduced pressure, and then distilled under vacuum to give 1.4 g. of 4-ethyl-1-formamido-cycloheptane having a boiling point of 164° C. (at 7 mm. Hg). Yield: 85 percent.

EXAMPLE 8

In 10 ml. of chloroform were dissolved 3.4 g. of trans-4-methylcyclohexylamine, and to the resulting solution 4.4 g. of chloral was added dropwise while stirring. The mixture was stirred for 1 hour at room temperature, and then refluxed for 30 minutes. The reaction mixture was concentrated under reduced pressure, and further distilled under vacuum to give 3.4 g. of trans-1-formamido-4-methylcyclohexane having a boiling point of 156° C. (at 20 mm. Hg). Yield: 80 percent.

EXAMPLE 9

In a mixture of 2.0 g. of 98 percent formic acid and 5.0 g. of acetic anhydride were dissolved 2.0 g. of 4-(1-methylpropyl) cyclohexylamine hydrochloride, and to the resulting solution 0.9 g. of sodium formate was added. The mixture thus formed was stirred for 1 hour at room temperature, whereby sodium chloride precipitated. The precipitates were separated by filtration, and the filtrate was concentrated under reduced pressure and further distilled under vacuum to give 1.5 g. of 1-formamido-4-(1-methylpropyl)cyclohexane having a boiling point of 101° to 102° C. (at 5 mm. Hg). Yield: 78.2 percent.

Elementary analysis as $C_{11}H_{21}NO$

|  | C(%) | H(%) | N(%) |
|---|---|---|---|
| Calculated: | 72.08 | 11.55 | 7.64 |
| Found: | 71.89 | 11.38 | 7.74 |

EXAMPLE 10

In a mixture of 2.0 g. of 98 percent formic acid and 5.0 g. of acetic anhydride were dissolved 1.4 g. of 2,4,6-trimethylcyclohexylamine, and the resulting solution was stirred for 1 hour at room temperature. The reaction mixture was concentrated under reduced pressure, and the residue obtained was recrystallized from petroleum benzene to give 1.2 g. of 1-formamido-2,4,6-trimethylcyclohexane having a melting point of 142° to 143° C. Yield: 71 percent.

Elementary analysis as $C_{10}H_{19}NO$

|  | C(%) | H(%) | N(%) |
|---|---|---|---|
| Calculated: | 70.96 | 11.31 | 8.27 |
| Found: | 71.03 | 11.04 | 8.46 |

EXAMPLE 11

In 4.6 g. of 98 percent formic acid were dissolved 1.6 g. of 4,4-dimethylcyclohexylamine, and to the resulting solution 6.75 g. of acetic anhydride was added dropwise while stirring. After stirring for 3 hours at room temperature, the reaction mixture was concentrated under reduced pressure and then distilled under vacuum to give 1.67 g. of 1-formamido-4,4-dimethylcyclohexane having a boiling point of 110° to 114° C. (at 1 mm. Hg). Yield: 86 percent.

Elementary analysis as $C_9H_{17}NO$

|  | C(%) | H(%) | N(%) |
|---|---|---|---|
| Calculated: | 69.63 | 11.04 | 9.02 |
| Found: | 69.54 | 10.97 | 8.99 |

EXAMPLE 12

In 20 ml. of a mixture of formic acid and acetic anhydride in the ratio 94.5:37.7 by volume were dissolved 4.5 g. of 4-(1-methylbutyl)cyclohexylamine. The mixture was heated at 40° to 50° C. for 1 hour, and then the formic acid and the acetic anhydride were distilled off under reduced pressure. The residue thus obtained was further distilled under vacuum to give 4.7 g. of 1-formamido14-(1-methylbutyl) cyclohexane having a boiling point of 120° to 139+ C (at 0.5 mm. Hg). Yield 86.8 percent.

Elementary analysis as $C_{12}H_{23}NO$

|  | C(%) | H(%) | N(%) |
|---|---|---|---|
| Calculated: | 73.04 | 11.75 | 7.10 |
| Found: | 73.11 | 11.72 | 7.28 |

EXAMPLE 13

In 20 ml. of a mixture of formic acid and acetic anhydride in the ratio 94.5:37.7 by volume were dissolved 4.5 g. of 4-nonylcyclohexylamine. The mixture was stirred at 40° to 50° C. for 1 hour, and then the formic acid and the acetic anhydride were distilled off under reduced pressure. The residue thus formed was further distilled under vacuum to give 4.4 g. of 1-formamido-4-nonylcyclohexylamine having a boiling point of 140° to 165° C. (at 0.5 mm. Hg). Yield: 85.7 percent.

Elementary analysis as $C_{16}H_{31}NO$

|  | C(%) | H(%) | N(%) |
|---|---|---|---|
| Calculated: | 75.83 | 12.33 | 5.53 |
| Found: | 75.91 | 12.28 | 5.39 |

EXAMPLE 14

In 20 ml. of 5 percent aqueous solution of sodium hydroxide were dissolved 3 g. of 4,5-dimethylcycloheptylamine monophosphate. The resulting mixture was allowed to stand for 1 hour at room temperature, and then extracted with 20 ml. of ether. The ether layer was separated, and the ether was distilled off under reduced pressure. The residue thus formed was dissolved in 20 ml. of a mixture of formic acid and acetic anhydride in the ratio 94.5:37.7 by volume. After stirring at 40° to 50° C. for 1 hour, the formic acid and the acetic anhydride were removed from the reaction mixture by distillation under reduced pressure. The residue thus obtained was further distilled under vacuum to give 2 g. of 1-formamido-4,5-dimethylcycloheptane having a boiling point of 125° to 130° C. (at 0.2 mm. Hg). Yield: 82.0 percent.

Elementary analysis as $C_{12}H_{19}NO$

|  | C(%) | H(%) | N(%) |
| --- | --- | --- | --- |
| Calculated: | 70.96 | 11.31 | 8.27 |
| Found: | 70.94 | 11.30 | 8.05 |

EXAMPLE 15

Tablets

Formulation:
| | |
| --- | --- |
| Trans-1-formamido-4-methylcyclohexane | .5 g. |
| Microcrystalline cellulose | 0.6 g. |
| Starch | 0.3 g. |
| Talc | 0.1 g. |

This formulation will make 30 tablets. The tablets are formed on a ⅛-inch deep cup punch. They may be coated according to a conventional method, if desired.

EXAMPLE 16

Injections

In 100 ml. of saline solution were dissolved 2 g. of trans-1-formamido-4-methylcyclohexane, and the solution obtained was aseptically divided and sealed into 100 ampuls. Each ampul thus prepared contains 20 mg. of the analgetically active compound.

What is claimed is:

1. The formamido-cycloalkane derivatives of the formula $$\begin{array}{c} H \quad NHCHO \\ R_1 \!\!-\!\!\!\fbox{(CH_2)_n}\!\!-\!\! R_2 \\ R_3 \end{array}$$

wherein $R_1$ and $R_2$ are same or different and each represents a hydrogen atom or a straight or branched chain alkyl radical having from one to five carbon atoms, $R_3$ represents a straight or branched chain alkyl radical having from one to 10 carbon atoms, and $n$ is an integer of from 1 to 2.

2. The compounds as claimed in claim 1 wherein $R_1$ and $R_2$ are each a hydrogen atom.

3. The compounds as claimed in claim 1 wherein $R_1$ is a hydrogen atom, and $R_2$ is a straight or branched chain alkyl radical having from 1 to 5 carbon atoms.

4. The compounds as claimed in claim 1 wherein $R_1$ and $R_2$ are each a straight or branched chain alkyl radical having from one to five carbon atoms.

5. The compounds as claimed in claim 1 wherein $R_1$ is a hydrogen atom, $R_2$ is a straight or branched chain alkyl radical having from one to five carbon atoms, and both $R_2$ and $R_3$ are bound to the same carbon atom.

6. Trans-1-formamido-4-methylcyclohexane.
7. Cis-1-formamido-4-methylcyclohexane.
8. 1-Formamido-4-methylcycloheptane.
9. 4-Ethyl-1-formamidocycloheptane.
10. 1Formamido-4-(1-methylbutyl)cyclohexane.
11. 1-Formamido-4-(1-methylpropyl)cyclohexane.
12. 1-Formamido-4nonylcyclohexane.
13. 1-Formamido-4,4-dimethylcyclohexane.
14. 1-Formamido-4,5-dimethylcycloheptane.
15. 1-Formamido-2,4,6-trimethylcyclohexane.

* * * * *